United States Patent
Rothleitner

(10) Patent No.: US 7,209,819 B2
(45) Date of Patent: Apr. 24, 2007

(54) DRIVE CIRCUIT FOR A FIRING CAP OF A VEHICLE RESTRAINT SYSTEM

(75) Inventor: Hubert Rothleitner, Villach (AT)

(73) Assignee: Infineon Technologies AG, Munich (DE)

( * ) Notice: Subject to any disclaimer, the term of this patent is extended or adjusted under 35 U.S.C. 154(b) by 483 days.

(21) Appl. No.: 10/723,939

(22) Filed: Nov. 26, 2003

(65) Prior Publication Data

US 2004/0108698 A1    Jun. 10, 2004

(30) Foreign Application Priority Data

Nov. 26, 2002   (DE) ................................ 102 55 115

(51) Int. Cl.
  *G05D 3/00*   (2006.01)
(52) U.S. Cl. .................... 701/45; 701/47; 307/10.6; 307/10.1; 247/341; 247/357
(58) Field of Classification Search ................ 701/45, 701/46, 47; 29/734–735; 257/343, 355; 307/10.6; 247/341, 357; B60R 21/02, 21/32, B60R 21/16
See application file for complete search history.

(56) References Cited

U.S. PATENT DOCUMENTS

| | | | | |
|---|---|---|---|---|
| 2,830,122 A | * | 4/1958 | Trousdale | 370/359 |
| 2,830,125 A | * | 4/1958 | George | 370/257 |
| 3,102,166 A | * | 8/1963 | Berch et al. | 379/111 |
| 3,919,620 A | * | 11/1975 | McMurray et al. | 363/135 |
| 4,121,102 A | * | 10/1978 | Wilson | 250/341.1 |
| 4,207,468 A | * | 6/1980 | Wilson | 250/341.1 |
| 4,586,715 A | * | 5/1986 | Scolari et al. | 463/50 |

(Continued)

FOREIGN PATENT DOCUMENTS

DE     100 02 375 A1    4/2001

(Continued)

OTHER PUBLICATIONS

Mathialagan A. et al., Microprocessor based ignition controller for the automobile industry, Computers in Industry, Dec. 1986, vol. 7, No. 6, p. 547-51.*

(Continued)

*Primary Examiner*—Cuong Nguyen
(74) *Attorney, Agent, or Firm*—Laurence A. Greenberg; Werner H. Stemer; Ralph E. Locher

(57) ABSTRACT

A drive circuit for a firing cap, triggerable by an electric direct current firing pulse, of a vehicle restraint system, has a firing circuit which forms a series connection of a high side switch to the firing cap and to a low side switch. The firing circuit is connected between a supply voltage of a first potential, and a reference voltage of a second potential, in parallel with a capacitor that stores energy. The firing circuit being activated by a drive signal which is fed simultaneously to the high side switch and the low side switch, in order to feed a firing current to the firing cap during the firing pulse. In addition, in the firing circuit, a power switching element is also connected in series with the high side switch and the low side switch in order to draw lost power from the firing circuit during the firing pulse.

18 Claims, 3 Drawing Sheets

U.S. PATENT DOCUMENTS

| | | | | |
|---|---|---|---|---|
| 4,613,847 A | * | 9/1986 | Scolari et al. | 340/473 |
| 4,623,824 A | * | 11/1986 | Scolari et al. | 315/241 R |
| 4,835,513 A | * | 5/1989 | McCurdy et al. | 340/438 |
| 4,990,884 A | * | 2/1991 | McCurdy et al. | 340/438 |
| 5,191,499 A | * | 3/1993 | Gaus et al. | 361/49 |
| 5,206,455 A | * | 4/1993 | Williams et al. | 102/201 |
| 5,207,208 A | * | 5/1993 | Ward | 123/596 |
| 5,581,103 A | * | 12/1996 | Mizukami | 257/355 |
| 5,734,317 A | * | 3/1998 | Bennett et al. | 340/436 |
| 6,245,607 B1 | * | 6/2001 | Tang et al. | 438/217 |
| 6,489,653 B2 | * | 12/2002 | Watanabe et al. | 257/343 |
| 6,523,149 B1 | * | 2/2003 | Mehrotra et al. | 716/4 |
| 6,584,965 B1 | * | 7/2003 | Ward | 123/605 |
| 6,747,318 B1 | * | 6/2004 | Kapre et al. | 257/368 |
| 2002/0121810 A1 | * | 9/2002 | Belau et al. | 307/10.1 |

FOREIGN PATENT DOCUMENTS

| | | | |
|---|---|---|---|
| DE | 102 23 950.9 | | 5/2002 |
| JP | 2000264117 A | * | 9/2000 |
| JP | 2000264122 A | * | 9/2000 |

OTHER PUBLICATIONS

U.S. Appl. No. 10/447,649, filed May 29, 2003, Rothleitner.

* cited by examiner

DRIVE CIRCUIT FOR A FIRING CAP OF A VEHICLE RESTRAINT SYSTEM

BACKGROUND OF THE INVENTION

Field of the Invention

The invention relates to a drive circuit for a firing cap, triggerable by an electric direct current firing pulse, of a vehicle restraint system. The drive circuit has a firing circuit which forms a series connection of a high side switch to the firing cap and of a low side switch. The firing circuit is connected between a supply voltage of a first potential, and a reference voltage of a second potential, in parallel with a capacitor which stores energy, and is activated by a drive signal which is fed simultaneously to the high side switch and the low side switch, in order to feed a firing current to the firing cap during the firing pulse.

FIG. 3 is a schematic view of a drive circuit that is currently manufactured and marketed by the present applicant. The firing energy which flows through the firing circuit during the firing pulse and which is composed of a firing cap 1, a high side switch 2 and a low side switch 3 is supplied by a vehicle battery 8 and by a capacitor 4 which has a capacitance C and stores energy which is charged by a boost regulator 6. Both the high side switch 2 and the low side switch 3 are closed during the firing pulse, initiated by a drive signal SA. The capacitor 4 that stores energy can be charged with energy both by the vehicle battery 8 and by the boost regulator 6. When the battery voltage is disconnected, for example at a node KL15, the firing energy must be supplied by the capacitor 4 alone.

So that a firing current of, for example, 1 amp to 3 amps, which is sufficient to fire the firing cap 1 (depending on the type of firing cap 1) can flow through the firing circuit during a time of, for example, 0.5 ms to 5 ms, even when the battery 8 is disconnected, the capacitor 4 must be able to store sufficient energy, that is to say it must have a sufficiently high capacitance, and is therefore large.

A further problem which can occur with vehicle accidents is an energy excess situation in the clamped load dump condition, for which reason the breakdown voltage of the capacitor 4 has to be larger than the maximum voltage of the power supply (for example 40 V) in case this occurs.

As is known, the capacitance of a capacitor that is necessary to store a certain amount of energy is inversely proportional to the square of the voltage across the capacitor. This advantage is frequently exploited to reduce the capacitance and also the size of the capacitor 4 that stores the energy in a vehicle restraint system.

However, as mentioned, there is a high probability of the battery supply in a vehicle becoming disconnected when accidents occur, the previously described situation of excess energy in the clamped load dump condition can occur, in which case the dynamo 7 ensures that the supply voltage is excessively increased at the node KL15, For this reason, the voltage class of the capacitor 4 must be configured in such a way that it withstands the excess voltage in the event of the excess energy in the clamped load dump condition.

In normal states, the voltage of a vehicle battery is in the range between 6 V and 18 V, which is too low for an optimized supply voltage for the capacitor 4. For this reason, the boost regulator 6 which increases a supply voltage $V_{bb}$ of the capacitor 4 to a value of up to 40 V is provided. The boost regulator 6 must therefore generate a boost voltage which lies in the region of the voltage that occurs in the situation of excess energy in the clamped load dump condition.

The firing cap 1 may be essentially considered as a resistor with a resistance value between 1 and 5 ohms. A firing event is triggered by closing the high side and low side switches 2 and 3 when a non-illustrated electronic regulator unit or ECU applies the firing signal $S_A$. If the voltage drop across the firing cap 1 is calculated during a firing event (during the firing pulse), it has approximately a value that is less than approximately 8 V. However, the voltage across the capacitor 4 that stores energy is much higher and generates a constant current across the firing cap 1 in the conductive state of the firing circuit. The constant current in turn ensures that there is a high voltage drop at the high side switch 2 and at the low side switch 3. Here, the energy which is consumed by the high side switch 2 and/or the low side switch 3 during the firing event depends on the firing current strength and on the voltage drop as well as on the switch-on time of the high side switch 2 and of the low side switch 3. The switch-on time of the transistors 2 and 3 of the firing circuit depends on the triggering time, that is to say the period of time until the firing cap 1 has fired. In the most extreme case, the length of the firing pulse, that is to say of the current through the firing circuit is equal to the length of the firing signal $S_A$ at the driver transistors 2 and 3 and is, for example, 0.5 to 5 ms, the firing signal $S_A$ being determined by the ECU. Since, as in the present case, the high side switch 2 and the low side switch 3 are integrated in an integrated circuit 5 as relative small transistors, the power loss which is consumed in the transistors 2 and 3, that is to say the heat which is generated cannot be absorbed by a heat sink (for example by a radiator).

For this reason, a technical problem which has to be solved in a drive circuit with regard to a firing cap which can be triggered by an electrical direct current firing pulse is to configure an integrated circuit 5 with comparatively cheap high side and low side switches 2, 3 in such a way that as many pairs as possible of high side switches and low side switches for a vehicle restraint system are integrated in a common integrated circuit, and nevertheless the power loss which is to be consumed by each pair of high side and low side switches even in the most extreme case can be kept sufficiently small. At the same time, the size of the capacitor 4 is to be reduced as far as possible.

In the prior art, the silicon area of the driver transistors 2 and 3, and thus their thermal capacity has hitherto been increased so that the driver transistors 2 and 3 can absorb a high amount of energy. However, if it is desired to accommodate a large number of driver transistors in a highly complex integrated circuit, high costs are incurred per area unit of the silicon chip in order to implement the driver transistors in high-voltage BICMOS technology. Therefore, this hitherto problem was solved at a high cost by integrating a large silicon area of the driver transistors using a complex wafer manufacturing technology.

A very important problem of a vehicle restraint system, which is relevant to safety, arises from the fact that a plurality of pairs of high side and low side switches are integrated in a single integrated circuit 5, that is to say in a single chip. If both driver transistors 2 and 3 for the firing cap 1 are inadvertently activated simultaneously due to some chip-internal fault, this leads to a faulty firing of the firing cap 1 with the consequence that, for example, an airbag unfolds without the relative external reason, which can lead to serious accidents.

The safety-relevant problem that was mentioned above was solved in the prior art by mechanically closable switches (the so-called safety sensor switches, for example microswitches) which are mounted outside the integrated circuit 5, or the problem was solved electrically by an additional triggering signal generated by mechanical components.

SUMMARY OF THE INVENTION

It is accordingly an object of the invention to provide a drive circuit for a firing cap of a vehicle restraint system that overcomes the above-mentioned disadvantages of the prior art devices of this general type, which permits an improved drive circuit for a firing cap, triggerable by an electrical direct current firing pulse, of a vehicle restraint system, in such a way that the above-mentioned problems are solved and as a result both a cost-intensive process technology and unintended firing of the firing cap when there is an undesired malfunction of the driver transistors are avoided.

With the foregoing and other objects in view there is provided, in accordance with the invention, a drive circuit for a firing cap, triggerable by an electric direct current firing pulse, of a vehicle restraint system. The drive circuit contains a firing circuit connected between a supply voltage of a first potential, and a reference voltage of a second potential. The firing circuit contains a high side switch having a control electrode and a controlled path connected to the firing cap, and a low side switch having a control electrode and a controlled path connected to the firing cap. The high side switch, the firing cap and the low side switch are connected in series. The firing circuit is activated by a drive signal fed simultaneously to the control electrode of the high side switch and of the low side switch for feeding a firing current to the firing cap during the firing pulse. A power switching element having a controlled path is connected in series with the controlled path of the high side switch and of the low side switch to draw lost power from the firing circuit during the firing pulse. A capacitor for storing energy is connected in parallel with the firing circuit.

According to one essential aspect, the drive circuit according to the invention for the firing cap, triggerable by the electrical direct current firing pulse, of the vehicle restraint system, is distinguished by the fact that, in the firing circuit, a power element is also connected in series with the high side switch and with the low side switch in order to absorb lost power from the firing circuit during the firing pulse.

With this measure it is possible to reduce the supply voltage for the plurality of driver transistor pairs in the integrated circuit; and to prevent a situation of excess energy at the supply pins of an integrated circuit containing the driver transistor pairs in a clamped load dump condition.

The proposed additional power element is, in one exemplary embodiment, a discrete N-type channel power FET which is an inexpensive power element which can absorb the energy during a firing event.

If, as in a preferred exemplary embodiment, the gate voltage of the external N-type channel FET is generated by a constant voltage source (for example 15 V), the external N-type channel FET has the function of a source follower whose source voltage is determined by the value of the gate voltage, the actual driver current, and the characteristic values of the device.

As a result, the supply voltage for the integrated circuit which contains the high side switch and the low side switch for the firing cap is stabilized, in particular at load current crossovers as a source follower is not a regulator which is subject to the disadvantages of possible instability. The constant voltage source that generates the gate voltage for the N-type channel power FET may be integrated, for example, in an integrated circuit chip which also contains the boost regulator. Alternatively, the constant voltage source can also be implemented discretely.

According to one essential aspect, the proposed power element is a switching element that can be switched on and off and connected to a control device that switches on the power switching element at least during the firing pulse, and then switch it off again. As long as the external power switching element is switched off, unintentional firing of the firing cap caused by any fault whatsoever is prevented.

In addition, when an external power switching element is switched off, a fault of the integrated circuit chip which contains the high side switch and the low side switch can be sensed by a driver test in which a current whose strength is far less than that necessary to fire the firing cap flows through the driver transistors. Such driver tests can be carried out by switching on an individual high side switch or low side switch without there being the need to limit the driver current to an uncritical value so that a firing event is not triggered. In the best case, the integrated circuit chip can be tested with the high side and low side switches with a genuine firing instruction as long as the external power switching element is definitely switched off.

If, as preferred, the high side and low side switches do not contain a reverse diode, that is to say both transistors have a reverse current blocking function, the N-type channel power FET which is preferably used as an external power switching element contains a reverse diode.

In the already mentioned preferred exemplary embodiment in which a plurality of pairs of high side and low side switches for a number of firing caps are integrated together in one integrated circuit chip, the power switching element which is connected outside the integrated circuit is preferably common to all the firing circuits.

The drive circuit according to the invention is preferably used for an airbag restraint system in a motor vehicle.

In accordance with an added feature of the invention, the control device switches on the power switching element before a start of the firing pulse. The high side switch and the low side switch are integrated and form an integrated circuit chip, and the power switching element is connected externally to the integrated circuit chip.

In accordance with a further feature of the invention, the high side switch is a P-type channel FET, the low side switch is an N-type channel FET, the power switching element is an N-type channel power FET, and the first potential is a high potential and the second potential is a low potential. Preferably, the N-type channel power FET is wired to operate as a source follower during a switched-on period and/or the N-type channel power FET contains a reverse diode.

Additionally, the high side switch and the low side switch may both have a reverse current blocking function.

In accordance with another feature of the invention, the high side switch and the low side switch together define one of a plurality of pairs that are assigned to a respective firing circuit and integrated in an integrated circuit. The power switching element, which is connected outside the integrated circuit, is common to all the firing circuits.

Other features which are considered as characteristic for the invention are set forth in the appended claims.

Although the invention is illustrated and described herein as embodied in a drive circuit for a firing cap of a vehicle restraint system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
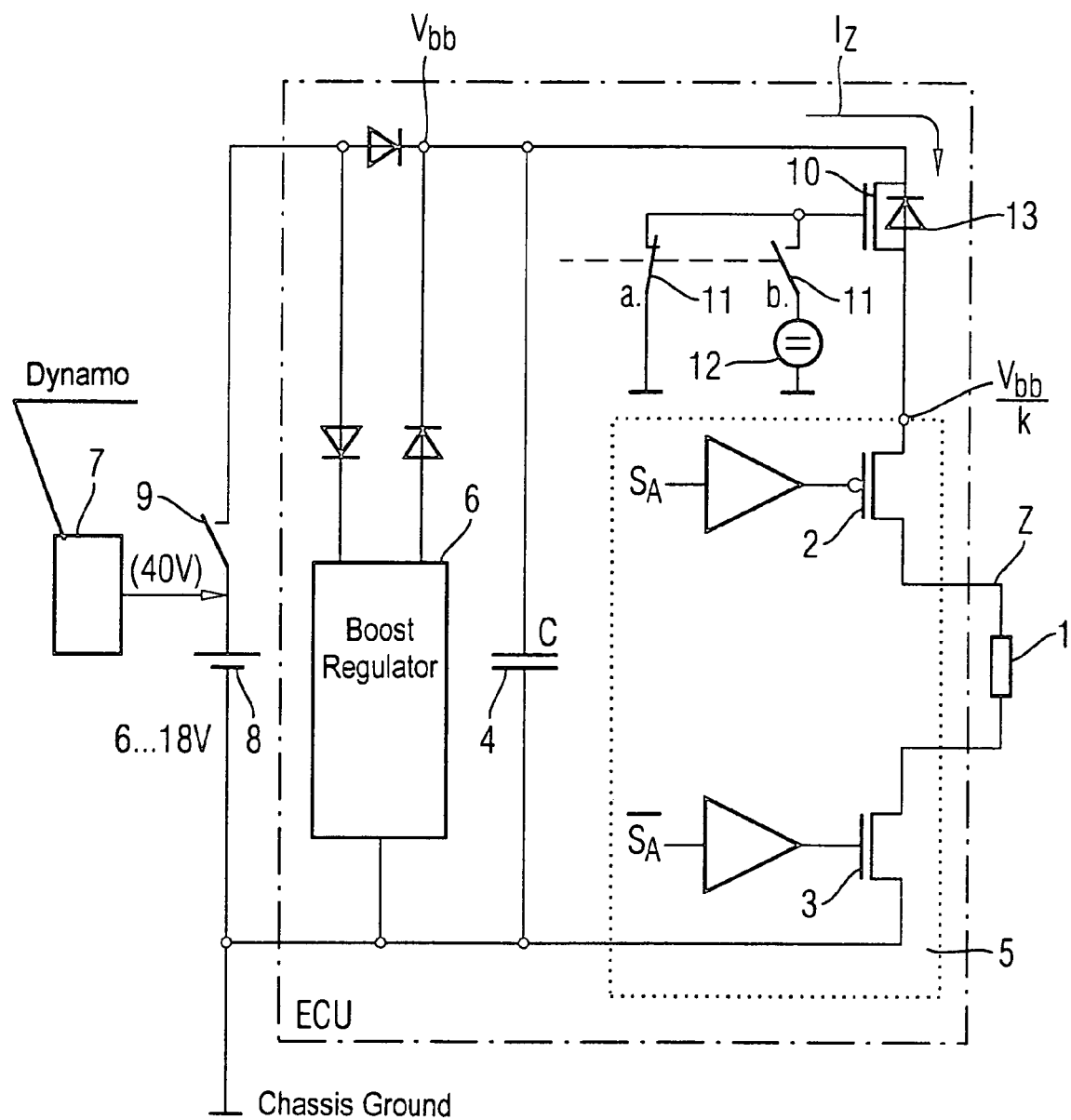
FIG. 1 is a schematic circuit diagram showing a preferred exemplary embodiment of a drive circuit according to the invention.

Referring now to the figures of the drawing in detail and first, particularly, to FIG. 1 thereof, there is shown a schematic view, partially in the form of a block circuit diagram, of a preferred exemplary embodiment of a drive circuit according to the invention for a firing cap, triggerable by an electric direct current firing pulse, of a vehicle restraint system, in particular of a motor vehicle airbag system. The firing circuit which conducts a firing current $I_Z$ is formed as already explained from a series connection of a high side switch 2 to a firing cap 1 and to a low side switch 3, and from a power switching element 10 which is connected, in the firing circuit, in series with the high side switch 2 and the low side switch 3 and outside an integrated circuit 5 which contains the high side switch 2 and the low side switch 3. The power switching element 10 is configured here as a source follower, and thus functions as an inexpensive power load. In the illustrated exemplary embodiment in which the high side switch 2 is implemented by a P-type channel FET, and the low side switch 3 by an N-type channel FET, the power switching element 10 is an N-type channel power FET and it reduces the original supply voltage at the supply voltage input of the integrated circuit chip 5, containing the high side switch 2 and the low side switch 3, to a value $1/k \cdot V_{bb}$ during the firing pulse. The value of the factor k being proportional to the drop in voltage at the external power switching element 10. The connection of a gate terminal of the N-type channel FET 10 to a constant voltage source 12 makes the former into a source follower that ensures that an approximately constant current flows through the firing cap 1 during the firing pulse Z. The voltage of the constant voltage source 12 is, for example, 15 V, and the voltage $1/k \, V_{bb}$ which is present at the supply voltage input of the integrated circuit chip 5 is 0 V when the power FET 10 is switched off, that is say opened, and, for example, 12 V when the power FET 10 is switched on, that is to say closed.

With the inventive connection, described above, to an external power load in the form of the power FET 10, the situation of excess energy in the clamped load dump condition, such as was previously described as a disadvantage for the prior art, is avoided at the supply voltage input of the integrated circuit since the external power switching element 10 can be switched on and off by a control device 11 (in the switch position of the control device 11 which is illustrated in FIG. 1 the power switching element 10 is switched off, that is to say is not energized). On the other hand, if switch "a" is opened and switch "b" is closed of the control device 11, the power switching element 10 is switched on. Then, when the high side switch 2 and the low side switch 3 are closed as a result of actuation with the control signal $S_A$, the firing current $I_Z$ flows through the firing circuit during the firing pulse Z which fires the firing cap 1.

At all times in which the external power switching element 10 is switched off, unintentional firing of the firing cap 1 such as could occur as a result of a fault in the integrated circuit chip 5 which affects the high side switch 2 and the low side switch 3 is avoided.

As a result of the energy which is consumed in the external power switching element 10 when firing occurs, the chip area which is taken up by the high side switch 2 and the low side switch 3 in the integrated circuit chip 5 can be reduced since the latter have to absorb the energy which is not absorbed by the firing cap 1 during the firing pulse. Instead, this excess energy is absorbed in the external power switching element 10. In the real situation in which a large number of pairs of high side switches 2 and low side switches 3 are integrated in the integrated circuit chip, the external power switching element 10 is a single inexpensive N-type channel power FET which is common to all the pairs, as a result of which a complicated and therefore expensive manufacturing process is not necessary for the chip 5, nor does the chip need to have a large area.

The boost voltage of the boost regulator 6 can be configured for the full voltage value of, for example, 40 V, such as would occur in a situation when the battery supply is disconnected, if the dynamo 7 supplies its voltage of 40 V. Therefore, the capacitor 4 which stores energy can be made relatively small as it can be configured for the relatively high boost voltage of approximately 40 V.

If the external N-type channel power FET 10 is switched off (in the position of the switches a and b of the control device 11 illustrated in FIG. 1), a fault of the integrated circuit chip 5 which could lead to unintentional firing of the firing cap 1 can be detected by testing the high side switch 2 or the low side switch 3 without a current which is sufficient to fire the firing cap 1 flowing. Such a test can be carried out by switching on the individual high side FET 2 or low side FET 3 while at the same time the external power FET 10 remains switched off. In the best case, the integrated circuit chip 5 can be tested with a genuine firing instruction as the external power FET 10 is definitely switched off.

The following exemplary voltages and currents are given below for an implemented circuit configuration of the exemplary embodiment of the drive circuit according to the invention which is illustrated in FIG. 1:

Voltage of the battery 8: 6 . . . 18 V;
Voltage of the dynamo 7 when the battery is disconnected: 40 V;
Boosted voltage $V_{bb} \leq 40$ V;
Reduced supply voltage $1/k \cdot V_{bb} = 12$ V (with the external power FET 10 switched on);
Firing current in the firing circuit $I_Z$: 1 A . . . 3 A (with the external power FET 10 switched on and the high side and low side switches 2, 3 switched on); and
Length of the firing pulse Z: 0.5 ms . . . 5 ms.

The chronological sequence of the switching on of the external power FET and of the high side and low side switches 2, 3 in the firing circuit $I_Z$ can be as follows:

a) When an imminent impact of the motor vehicle is detected, the external power FET 10 is first switched on, for example for a duration of 150 to 400 ms;
b) If an actual impact of the motor vehicle has been sensed by sensors and detected by the ECU, the drive signal $S_A$ is applied to the high side switch 2 and the low side switch 3, for example for a period of 0.5 ms to 5 ms, while the external power FET 10 continues to be energized; and
c) In the event of an actual impact, a number of firing events can be carried out for a plurality of firing caps 1 within the time period from 150 to 400 ms, while the external power FET 10 is closed, that is to say switched on. For this purpose each pair of high side and low side switches 2, 3 in the integrated circuit chip 5 are provided with a separate drive signal $S_A$ by the ECU.

Even in the event of the vehicle battery 8 being disconnected, which is possible when motor vehicles are involved in impact accidents, the energy stored in the capacitor 4 is sufficient to trigger a plurality of firing events, that is to say trigger a plurality of firing caps 1, during the switch-on time of the external power FET 10. The capacitor 4 may be configured to be relatively small, that is to say have a relatively small capacitance as the boost voltage of the boost regulator 6 is approximately 40 V.

The circuit area occupied by the high side and low side switches 2 and 3 in the integrated circuit chip 5 can be kept relatively small and it is not necessary to use complicated fabrication technology for this reason to fabricate the integrated circuit chip 5 as the external power switching element 10 in its conductive state absorbs a large part of the energy released during the firing event. The external power switching element may be an inexpensive N-type channel power FET. The constant voltage source 12 may either be integrated into the boost regulator 6 or be implemented by discrete switching elements.

At this point reference will be made to Published, Non-Prosecuted German Patent Application DE 102 23 950 A, corresponding to U.S. patent application Ser. No. 10/447,649, which is hereby incorporated by reference. In the application MOS power transistors that are suitable for the use here are described as high side and low side switches. A NMOS power transistor which is described therein is configured as a high side transistor in such a way that it prevents a reverse current through the high side switch in the event of the load being short-circuited, that is to say if in the present case the firing cap comes into contact with the battery supply line. A further DMOS power transistor which is described in the aforesaid, German application, and can be used as a low side transistor, is also equipped with reverse current protection so that here too a reverse current through the low side switch is avoided if the firing cap comes into contact with the chassis ground. It is to be noted here that in the exemplary embodiment of the drive circuit according to the invention that is illustrated in FIG. 1, the high side switch 2 and the low side switch 3 do not have a reverse diode. Therefore, in the drive circuit according to the invention, the high side switch 2 and the low side switch 3 which each have a reverse current blocking function are preferably used, as described in the previously mentioned earlier German Patent Application DE 102 23 950 A, and that the external N-type channel power FET 10 contains a reverse diode 13. As most commercially available N-type channel power FETs contain such a reverse diode, inexpensive N-type channel power FETs can be used for the external power switching element 10.

Figure 2:
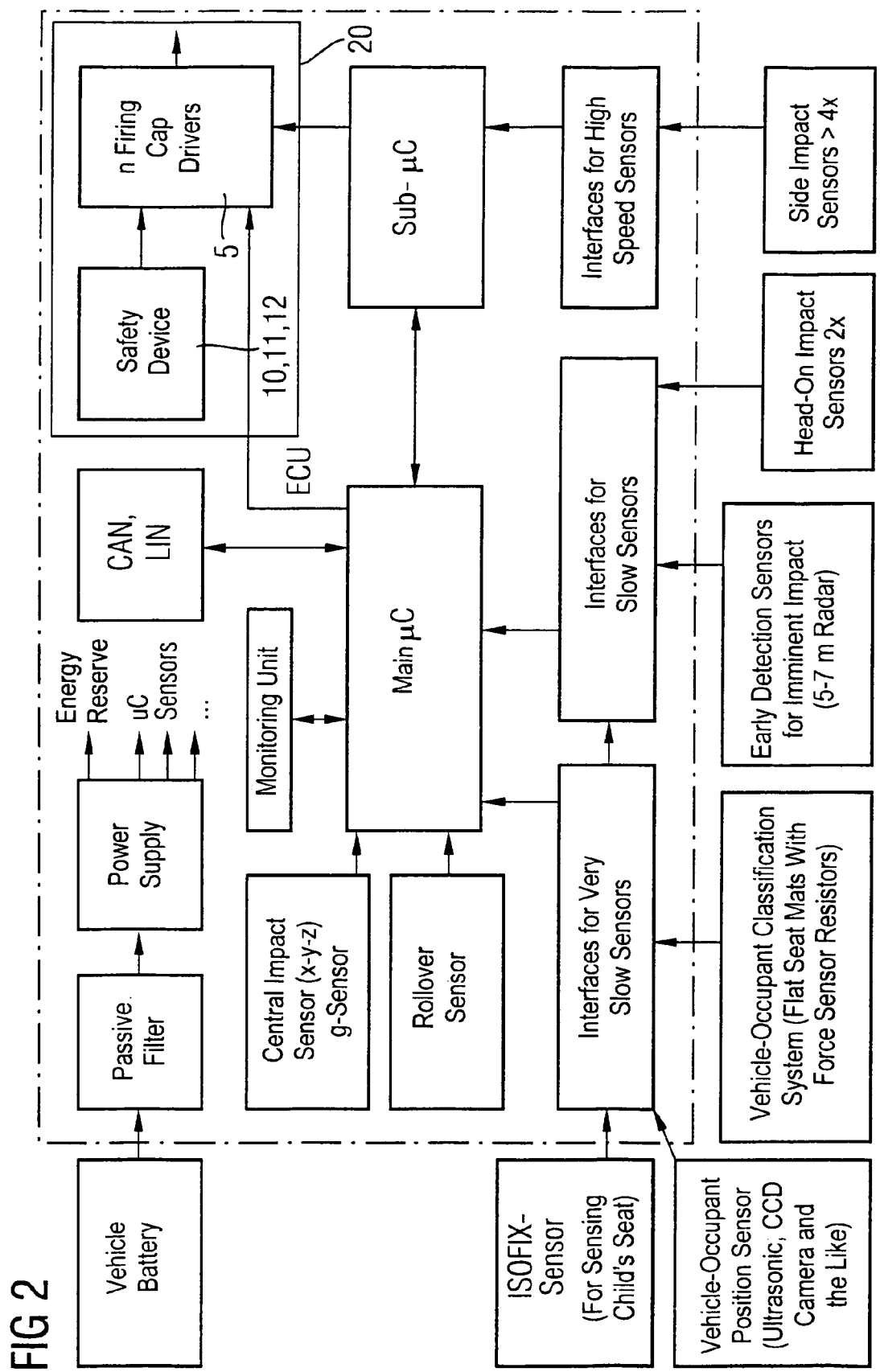
FIG. 2 is a functional block diagram of a motor vehicle airbag system in which the drive circuit according to the invention is used.
Figure 3:
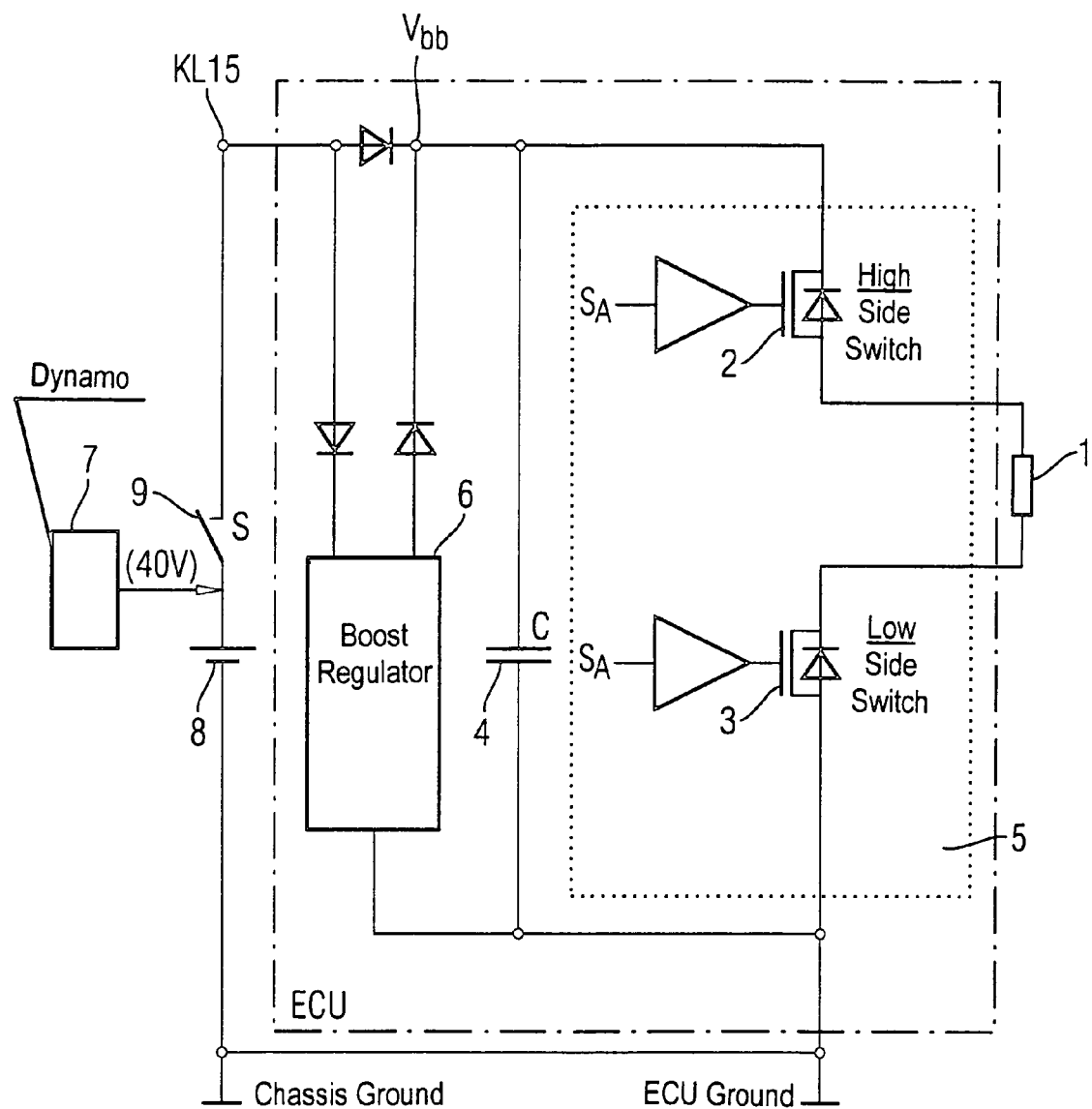
FIG. 3 is a schematic circuit diagram of a known drive circuit for a firing cap, triggerable by an electric direct current firing pulse, of a vehicle restraint system.

FIG. 2 shows a functional block diagram of a motor vehicle airbag system whose central component is an ECU that has a main microprocessor 30 (main μC) and a submicroprocessor 31 (sub-μC). The main microprocessor 30 is connected to a CAN bus system and/or a LIN bus system 32, a monitoring unit 33, a central impact sensor 34 (X-Y-Z gravitation sensor), a rollover sensor 35 and to interfaces 36, 37 for very slow sensors and for slow sensors. The submicroprocessor 31 has interfaces for high speed sensors 38. A drive circuit 20 according to the invention which is enclosed by a line is composed of the firing cap driver chip 5 according to FIG. 1 which has n firing cap drivers, that is to say n paired high side and low side switches 2 and 3, and a safety device which contains the elements designated by 10, 11 and 12 in FIG. 1, and to which drive signals are fed by the main microprocessor 30 and the submicroprocessor 31.

The boost regulator 6 according to FIG. 1 which is assigned to the ECU and the capacitor 4 which stores energy are part of a power supply unit 39 which is shown in FIG. 2 and which supplies feed energy for the various components of the ECU and also for the drive circuit according to the invention. The power supply unit 39 is connected to a vehicle battery 40 by a passive filter 41 which is connected between them.

Signals from a vehicle-occupant classification system 42 and/or a vehicle-occupant position sensor 43 and/or an isofix sensor 44 can be input into the main microprocessor 30 via the interfaces for very slow sensors. Signals from early detection sensors 45 for an imminent impact and/or signals from head-on impact sensors 46 can be input into the main microprocessor 30 via the interfaces for slow sensors. The interfaces for the high speed sensors 38 which are connected to the submicroprocessor 31 which is configured for high speed processing can receive signals from side impact sensors 47.

Of course, the functional structure (shown schematically in FIG. 2) of a motor vehicle airbag system that uses the drive circuit according to the invention may be merely exemplary and may be varied from case to case.

The drive circuit proposed according to the invention is equipped with the functions and elements described above and has the following advantageous features either individually or in combination:

(a) An inexpensive power load is connected externally to the integrated circuit chip 5 which has the high side and low side switches 2, 3, the power load being preferably an N-type channel power FET 10 which can be switched on and off as a source follower;

(b) Reliable protection against unintentional firing of the firing cap 1, which could be caused by faults in the integrated circuit chip, is provided by the possibility of switching on and off the external N-type channel power FET 10 as the external power switching element remains switched off for as long as impact is not imminent;

(c) When the external power switching element is open, the firing circuits in the integrated circuit chip can be tested with real-time firing instructions;

(d) The boost voltage $V_{bb}$ of the boost regulator 6 may be programmed to the value that arises in the case of excess energy in a clamped load dump condition when the vehicle battery is disconnected. As a result, an optimum between energy stored in the capacitor that stores energy and the maximum occurring input voltage is achieved;

(e) The capacitor that stores energy may have a relatively small capacitance;

(f) The supply input voltage of the integrated circuit chip 5 which has the pairs of high side and low side switches can assume a minimum value depending on the characteristic values of the firing cap 1 and the switch-on resistances of the high side and low side switches 2 and 3. As a result, the energy that is absorbed in the integrated circuit chip 5 during the firing pulse can be kept small;

(g) By using an inexpensive commercially available N-type channel power FET which contains a reverse diode it is possible for both the high side switch and the low side switch in the integrated driver chip to have the reverse current blocking function according to the previously mentioned, earlier Published, Non-Prosecuted German Patent Application DE 102 23 950 A.

I claim:

1. A drive circuit for a firing cap, triggerable by an electric direct current firing pulse, of a vehicle restraint system, the drive circuit comprising:
   a firing circuit connected between a supply voltage of a first potential, and a reference voltage of a second potential, said firing circuit containing:
      a high side switch having a control electrode and a controlled path connected to the firing cap;
      a low side switch having a control electrode and a controlled path connected to the firing cap, said high side switch, the firing cap and the low side switch being connected in series, said firing circuit being activated by a drive signal fed simultaneously to said control electrode of said high side switch and of said low side switch for feeding a firing current to the firing cap during the firing pulse;
      a power switching element having a controlled path connected in series with said controlled path of said high side switch and of said low side switch to draw lost power from said firing circuit during the firing pulse; and
   a capacitor for storing energy and connected in parallel with said firing circuit.

2. The drive circuit according to claim 1, further comprising a control device for switching on said power switching element at least during the firing pulse, and then switching said power switching element off again, said power switching element is a switching element which can be switched on and off and is connected to said control device.

3. The drive circuit according to claim 2, wherein said control device switches on said power switching element before a start of the firing pulse.

4. The drive circuit according to claim 1, wherein said high side switch and said low side switch are integrated and form an integrated circuit chip, said power switching element is connected externally to said integrated circuit chip.

5. The drive circuit according to claim 1, wherein:
   said high side switch is a P-type channel FET;
   said low side switch is an N-type channel FET;
   said power switching element is an N-type channel power FET; and
   the first potential is a high potential and the second potential is a low potential.

6. The drive circuit according to claim 5, wherein said N-type channel power FET is wired to operate as a source follower during a switched-on period.

7. The drive circuit according to claim 5, wherein said N-type channel power FET contains a reverse diode.

8. The drive circuit according to claim 7, wherein said high side switch and said low side switch both have a reverse current blocking function.

9. The drive circuit according to claim 1, wherein said high side switch and said low side switch together define one of a plurality of pairs which are assigned to a respective said firing circuit and integrated in an integrated circuit, and said power switching element, which is connected outside said integrated circuit, is common to all said firing circuits.

10. The drive circuit according to claim 1, wherein the vehicle restraint system is an airbag restraint system in a motor vehicle.

11. A vehicle restraint system, comprising:
    one or more firing circuits, each firing circuit being assigned to a respective firing cap and triggerable by an electric direct current firing pulse;
    each firing circuit being connected between a supply voltage of a first potential, and a reference voltage of a second potential and including:
       a high side switch having a control electrode and a controlled path connected to the firing cap;
       a low side switch having a control electrode and a controlled path connected to the firing cap, said high side switch, the firing cap and the low side switch being connected in series, said firing circuit being activated by a drive signal fed simultaneously to said control electrode of said high side switch and of said low side switch for feeding a firing current to the firing cap during the firing pulse;
       a power switching element having a controlled path connected in series with said controlled path of said high side switch and of said low side switch to draw lost power from said firing circuit during the firing pulse; and
    a capacitor for storing energy and connected in parallel with said firing circuit; and
    said high side switches and said low side switches of each firing circuit being integrated and forming an integrated circuit chip, and said power switching element being connected externally to said integrated circuit chip and provided in common to all pairs of said integrated high side switches and low side switches.

12. The vehicle restraining system of claim 11, further including a control device for switching on said power switching element at least during the firing pulse, and switching said power switching element off again, said power switching element being a switching element which can be switched on and off and being connected to said control device.

13. The vehicle restraint system of claim 12, wherein said control device switches on said power switching element before the start of a firing pulse.

14. The vehicle restraint system of claim 11, wherein:
    said high side switch is a P-type channel FET;
    said low side switch is an N-type channel FET;
    said power switching element is an N-type channel power FET; and
    the first potential is a high potential and the second potential is a low potential.

15. The drive circuit according to claim 14, wherein said N-type channel power FET is wired to operate as a source follower during a switched-on period.

16. The vehicle restraint system of claim 14, wherein said N-type channel power FET contains a reverse diode.

17. The vehicle restraint system according to claim 16, wherein said high side switch and said low side switch both have a reverse current blocking function.

18. The vehicle restraint system of claim 11, wherein the vehicle restraint system is an airbag restraint system in a motor vehicle.

* * * * *